United States Patent [19]

Mallary

[11] Patent Number: 5,801,910

[45] Date of Patent: Sep. 1, 1998

[54] LONG SATURATION ZONE MAGNETIC WRITE HEAD

[75] Inventor: Michael Mallary, Berlin, Mass.

[73] Assignee: Quantum Corporation, Milpitas, Calif.

[21] Appl. No.: 867,240

[22] Filed: Jun. 2, 1997

[51] Int. Cl.[6] ................................................ G11B 5/147
[52] U.S. Cl. ............................................. 360/126
[58] Field of Search ................................ 360/126

[56] References Cited

U.S. PATENT DOCUMENTS

| | | | |
|---|---|---|---|
| 5,018,038 | 5/1991 | Nakanishi | 360/126 |
| 5,134,535 | 7/1992 | Mallary | 360/126 |
| 5,198,949 | 3/1993 | Narisawa et al. | 360/126 |
| 5,373,408 | 12/1994 | Bischoff et al. | 360/126 |
| 5,600,519 | 2/1997 | Heim et al. | 360/126 |

OTHER PUBLICATIONS

IEEE Transactions on Magnetics, vol. 32, No. 3, Sep. 1996, M.L. Mallary, "Effective Field Gradient Dependence on Write Field Rise Time".

*Primary Examiner*—John H. Wolff
*Attorney, Agent, or Firm*—Francis A. Sirr; William J. Kubida; Holland & Hart LLP

[57] ABSTRACT

In a magnetic write head, the top pole piece reduces in width and cross-sectional area in a number of steps by providing a first wide tapered zone whose width progressively decreases at a first rate that is determined by side surfaces that are inclined at an angle of about 45 to 55-degrees, and providing a second narrow tapered zone whose width progressively decreases at a second lower rate that is determined by side surfaces that are inclined at an angle of about 5-degrees. This second narrow tapered zone may comprise the serial arrangement of three individual zones, a first of which whose width decreases at a rate that is determined by side that are inclined at about 4.7-degrees, a second of which whose width decreases at a rate that is determined by side that are inclined at about 5.7-degrees, and third of which whose width decreases at a rate that is determined by sides that are inclined at about 6.8-degrees. The pole piece's tapered zone terminates in a narrow and constant width pole tip. As a result, a long magnetic flux saturation zone is provided, wherein length is measured in a direction that extends toward the head's pole tip or write gap. A gap field versus write current (Bg-vs-Iw) curve is thereby provided having a high magnitude Bg and nearly flat slope Bg saturation region. The head is driven with an excess magnitude Iw, thus causing the head's Bg to increase rapidly to its optimum high magnitude, whereupon the increase in Bg abruptly stops. Better overwrite (OVW) is provided, less non linear transition shift (NLTS) occurs, and narrower read-back pulses are provided, at both the inner diameter (ID) and outer diameter (OD) of an associated magnetic recording disk.

12 Claims, 7 Drawing Sheets

LONG SATURATION ZONE MAGNETIC WRITE HEAD

BACKGROUND OF THE INVENTION

1. Field of the Invention

This invention relates to the field of data processing, to the field of magnetic data recording, and more specifically to a new and unusual magnetic recording head yoke apparatus/method that operates to improve the magnetic recording write process.

2. Description of the Related Art

Prior art write head yokes, or pole pieces, have been formed so as to have a generally funnel shape. That is, only one convergence break point was physically connected to the yoke's constant-cross-sectional-area pole-tip-region. This prior construction operated to concentrate the head's write flux at or within the head's pole tip region, and operated to provide a magnetic flux saturation characteristic that is relatively rounded, for example see curve 101 of FIG. 1's gap-field versus write-current curve, also known as the Bg-vs-Iw curve.

In order to provide satisfactory NLTS and OVW in a write head, an optimum and relatively high magnitude Bg is required. Also, Bg must be switched rapidly as data is written on an associated magnetic media, such as tape or disk. Rapid switching of the write gap's magnetic field Bg desirably expands the operating point where the write magnetic field Bg equals the media's switching field (Hc), sometimes called the write bubble, at a velocity Vb that greatly exceeds the media's velocity Vm. The publication *IEEE TransMag*, MAG-32, November 1996, by M. Mallary is cited for a discussion of these magnetic recording characteristics.

FIG. 2 is a side view, and FIG. 3 is a top view, of such a prior art magnetic recording write head 20 having a single convergence portion 21 or 321 within the head's top pole piece 22. While these figures show a geometrically exact convergence portion 21, it is recognized that less than desirable manufacturing processes may provide a somewhat smeared transition area 321 within the pole piece.

Considering this typical head, FIG. 3, and top pole piece 22 in the X-direction that extends toward the head's transducing gap 29, pole piece 22 serially comprises a wide portion 40, a convergent portion 35 that is bounded by dotted lines 36 and 34, and a narrow portion 39 that terminates at write gap 29. As is well known, electrical energization 310 of write coil 300 operates to induce magnetic flux to flow through the series flux circuit that comprises top pole piece 22, gap 29, and bottom pole piece 25.

Note that the Y-Z plane cross-sectional area of wide portion 40 usually, but not necessarily, remains essentially constant throughout the X-direction length of portion 40; i.e., the area of wide portion 40 as measured in the Y-Z plane is essentially a constant. However, the Y-Z plane cross-sectional area of convergent portion 35 continually reduces in magnitude, reaching its smallest cross-sectional area at about dotted line 34, this smallest area being generally equal to the cross-sectional area of narrow pole tip portion 39. Top pole piece 22 then terminates at narrow portion 39, which again usually has a Y-Z plane cross-sectional area that remains essentially constant throughout the X-direction length of portion 39.

As is apparent to those of skill in the art, magnetic flux density (flux lines per unit cross-sectional area) is lowest within wide portion 40, gradually increases in magnitude throughout the X-direction length of convergent portion 35, and is of its highest magnitude within narrow portion 39.

As can be best seen from FIG. 3, the head's single convergence portion 35 is formed by two opposite-side-disposed pole surfaces 21 that extend generally normal to the X-Z plane and that taper or converge to provide a gradually reducing pole cross-sectional area within the convergent portion 35,321 of top pole piece 22. As shown in FIG. 3, surfaces 21 extend at an angle 37 that is generally in the range of about 37-degrees to about 55-degrees to the figure's X-direction.

As a result of the single-step reduction 321 in pole cross-sectional area that occurs between dotted lines 36 and 34 of FIG. 3, magnetic flux saturation of top pole piece 22 occurs within a relatively short X-direction flux saturation zone 23 that is generally coincident with dotted line 34. As defined herein, the length dimension of saturation zone 23 is measured in the X-direction that extends generally normal to the head's air bearing surface (ABS) 24. As the head's write current is increased above the point where saturation initiates at portion 34, the saturation zone gradually expands toward the head's ABS 24. The resulting gradual increase in magnetic impedance leads to a slow flattening of the prior art Bg-vs-I curve as is shown at 101 of FIG. 1

Head 20 may take a variety of specific forms. As used herein, the term head includes, without limitation, both longitudinal and perpendicular recording heads. For purposes of simplicity, head 20 is shown in FIGS. 2 and 3 as having only a bottom pole piece or yoke 25, an intermediate nonmagnetic or gap layer 26 (see FIG. 2), and a top pole piece or yoke 22.

The two physically spaced and parallel tips 27, 28 of the respective top and bottom poles 22, 25 are planar-coincident; i.e., they both lie in the same Y-Z plane. Tips 27, 28 form a longitudinal write transducing gap or space 29 that is occupied or filled by gap material 29. The specific materials from which poles 22, 25 and gap 29 are formed are not the subject of this invention. It suffices to say that poles 22, 25 are made from a material that has a high permeability, a low coercivity, and a high electrical resistance, an example of which is the Permalloy brand of NiFe. Gap 29 comprises a nonmagnetic material, examples of which are silica and alumina.

As is well known, a fringe magnetic field (not shown) at the general X-Y-Z volume of gap 29 operates to induce a remnant state of magnetization in the Y-direction, and throughout an X-direction depth, of a closely adjacent magnetic recording media 30, as relative movement 33 occurs in the X-direction between head 20 and media 30.

Media 30 may comprise a length of magnetic recording tape, or may comprise an annular portion of a magnetic recording disk that is spinning on an X-direction axis, this annular disk portion extending between the disk's inner diameter track (ID) and the disk's outer diameter track (OD). As shown in FIG. 3, the head's write-track-width 38 is generally determined by the Z-direction width of tip 27 of upper pole piece 22.

While write head 20 may comprise an in-contact head, FIGS. 2, 3 show head 20 as being a flying-head wherein the head's Y-Z planar ABS 24 is separated from the adjacent Y-Z planar surface of media 30 by way of an X-direction flying height 31, usually measured in the range of micro inches.

Although the various figures of this application depict a longitudinal recording head and media system, the long saturation zone apparatus/method described herein can be applied to a number of perpendicular recording head geometry as well. For example, a single pole perpendicular head can be formed in accordance with this invention so as to have a long saturation zone as described herein.

As stated above, prior write heads of the FIG. 2, 3 type provide a very short saturation region 23 that is relatively rounded when the head's Bg-vs-Iw curve is investigated.

The present inventor has discovered that when write head yokes, or pole pieces, such as yoke 22 of FIGS. 2, 3, are formed to have a single generally funnel shape 35, as is defined by the two oppositely disposed confluence surfaces 21 shown in FIG. 3 (i.e., only one break point 34 is provided where the decreasing cross-sectional area of yoke 22 joins the yoke's constant area tip region 39) the head's write magnetic flux is concentrated at the pole tip region 39, and this construction and arrangement operates to provide a Bg-vs-Iw operating characteristic whose saturation region is undesirably rounded, thus resulting in less than satisfactory NLTS and OVW characteristics for the write head.

SUMMARY OF THE INVENTION

Improved non-linear-transition-shift (NLTS) and overwrite (OVW) are provided in a magnetic write head that exhibits a high deep gap-field (Bg), and a very flat saturation region in its Bg-v-Iw curve. This is achieved by having two or more width-slope-break-points, also called confluence-points or confluence zones, in the head's yoke geometry.

The write head's top yoke (i.e., the yoke member having a narrow tip region that defines the head's track width) is shaped in its multiple confluence region such that the yoke contracts, funnels, or narrows in a number of stages, such that a long region or zone of the yoke abruptly saturates when an optimum value of Bg is reached. This long saturated zone prevents the Bg from exceeding the optimum value.

As a result, excess magnitudes of Iw can be used to energized the head's write coil, thereby providing very high dB/dt during the write process which will then occur in the steep region of the Bg vs. Iw curve, just below the curve's saturation knee. This, in turn, yields a high write field gradient which in turn yields good NLTS, good OVW, and narrow read-back pulse width.

Stated in another way, the present invention provides a new and unusual magnetic pole, pole piece, or yoke for a magnetic recording write head, for example, of the longitudinal or perpendicular type. The geometric shape of the yoke operates to limit the head's write gap magnetic field or flux Bg to an optimum value by providing a high magnitude Bg that has a very flat saturation region within the head's Bg-versus-Iw characteristic curve. As a result, the head's write coil can be driven with an excess magnitude Iw, so that the head's write gap field Bg increases rapidly to its optimum value, whereupon the write gap field abruptly stops increasing at this optimum value due to saturation of a yoke that has a new and unusual geometry in accordance with this invention. The result is better OVW, less NLTS, and low pulse width at both the inner and outer diameters of an associated magnetic recording disk.

An object of the present invention is to provide a magnetic write head wherein NLTS, OVW and pulse width are improved by virtue of a yoke, pole, pole-piece, or yoke-flux-pipe design that yields a large magnitude deep gap flux field Bg within the head's write-gap, while at the same time, providing a very flat saturation region within the head's Bg-vs-Iw characteristic curve.

These new and unusual results are achieved by providing a head yoke that has at least two cross-sectional-area-change break points throughout which, or between which, saturation occurs.

In accordance with this invention, the cross-sectional-area-change break points are defined by angled side walls wherein the angles at which these walls extend are small enough (i.e., less than 12 degrees) to cause simultaneous saturation to occur along the length of the cross-sectional-area-change break points.

The two-stage funnel shape of the present invention (FIGS. 4-6), and the four-stage funnel shape of the present invention (FIG. 7), provide a yoke that is tailored to contract, or reduce, in cross-sectional area such that a long region of the yoke saturates at generally the same time when a desired value of write gap flux Bg is reached within the head's write gap.

As stated above, it is important to the present invention that the cross-sectional-area-change break points of the yoke be defined by angled side walls wherein the angles at which these walls extend are small enough (i.e., less than 12-degrees) to cause simultaneous saturation to occur along or across the cross-sectional-area-change break points. In this way, a long region of the yoke saturates at generally the same time when a desired value of write gap flux Bg is reached within the head's write gap.

The large length of this saturation zone prevents the gap field Bg from exceeding a desired value. As a result, an excess magnitude of write current Iw can be used to energize the head's write coil, thus providing a very high time rate of change of gap flux (dB/dt) during the head's write process. This in turn yields good NLTS, OVW, and read-back pulse width.

An object of this invention is to provide a write head having a yoke wherein the rate of change of cross-sectional area within a first yoke region is usually, but not necessarily, zero, followed by a second yoke region wherein the rate of change of cross-sectional area is relatively low, followed by a third yoke portion wherein the rate of change of cross-sectional area region is relatively low, followed by a fourth tip region wherein the rate of change of cross-sectional area is usually, but not necessarily, zero. When magnetic flux is induced to flow within this yoke by electrical energization of a write coil, the flux is confined to its smallest area within the fourth tip region, and the magnitude of the flux that flows at the head's write gap is controlled to be equal to a desired value by virtue of a cooperation between the above described second and third yoke regions that yield a long flux saturation zone at least within the third yoke region, such that this entire third region saturates substantially simultaneously when the desired value of flux is reached at the write gap. The relatively long length of the third saturated yoke region prevents the write gap flux Bg from thereafter increasing by any great amount, thereby yielding a low saturation slope to the head's gap-flux/write-current characteristic curve.

These and other objects, advantages and features of the present invention will be apparent to those of skill in the art upon reference to the following detailed description of preferred embodiments of the invention, which description makes reference to the drawing.

BRIEF DESCRIPTION OF THE DRAWING

FIG. 6 is a view similar to FIG. 5 wherein FIG. 6 is used to define certain dimensions of an embodiment of the invention.

DESCRIPTION OF THE PREFERRED EMBODIMENTS

Figure 1:
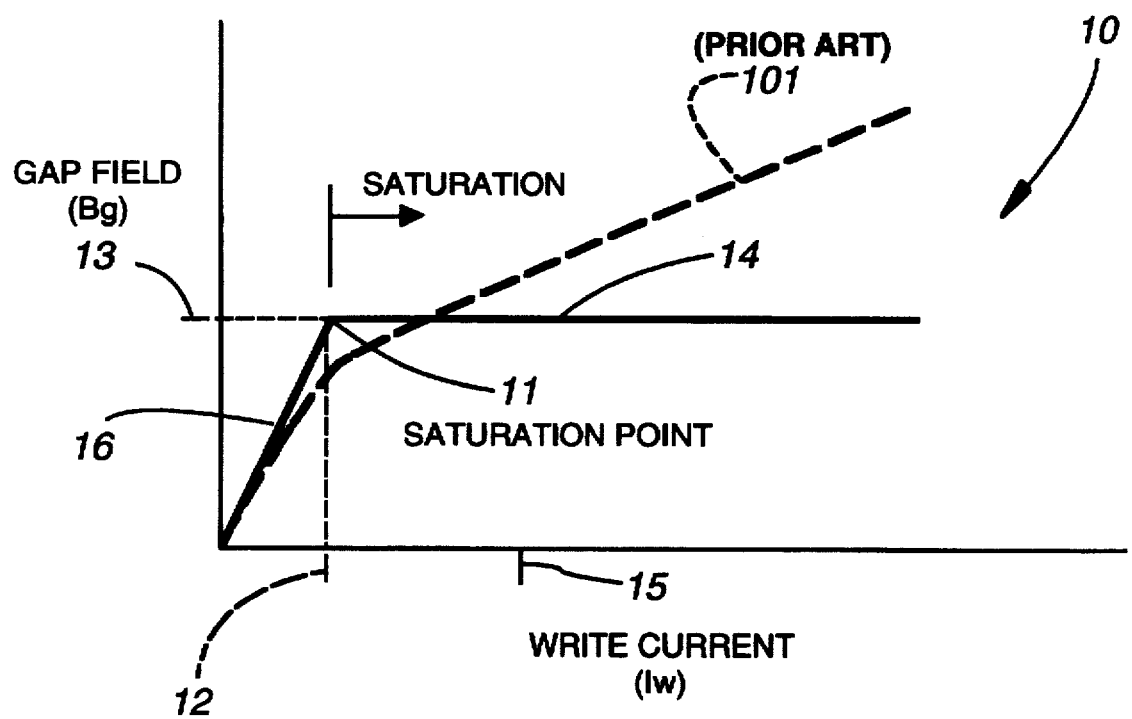
FIG. 1 is an example of a magnetic recording write head's Bg-versus-Iw solid line characteristic curve that is achieved by use of a magnetic pole, pole piece, or yoke, in accordance with the present invention, wherein the dashed line curve of FIG. 1 shows results that are achieved by typical prior art designs.

FIG. 1 shows an example of a Bg-vs-Iw curve 10 that is achieved by the use of a magnetic recording write head having a multiple-confluence-designed magnetic pole or yoke in accordance with the present invention. This figure plots Iw on the horizontal axis, with increasing magnitudes of Iw extending horizontally to the right, and plots Bg on the vertical axis, with increasing magnitudes of Bg extending vertically upward. A saturation point, or knee 11, occurs within an associated double-confluence write head yoke (FIGS. 4–6), and an associated four-confluence write head yoke (FIG. 7), or more generally, an associated multiple-confluence write head yoke, in accordance with this invention when the magnitude of Iw indicated at 12 is reached.

In general, it can be said that a flat saturation slope region 14 within curve 10 provides good NLTS and pulse width performance, whereas a high magnitude or value 13 for Bg provides good OVW performance. While a zero slope for curve portion 14 is ideal, in general, the slope of curve portion 14 after saturation knee 14 should be less than ⅛$^{th}$ of the slope of curve portion 16 before saturation knee 14.

Such a magnetic write head in accordance with this invention exhibits a high and deep Bg value 13, and a very flat saturation region 14 in its Bg-versus-Iw curve 10. This is achieved by having two or more width/area break-points, also called confluence-points, in the head's yoke geometry, as will be described. An example of the value of Bg 13 is in the range of from about 5.4 KG to about 7.6 KG in order to write on media with a coercive field of about 2200 Oersteds. For example, use of well-known NiFe material in a yoke that is constructed and arranged in accordance with this invention causes the yoke to saturates for field values generally greater than 7.0 KG.

As a result, excess magnitudes of Iw, such as for example FIG. 1's Iw magnitude 15, can be used, thereby providing a very high dB/dt during the head's write process without driving the write process into the low slope region of the saturation curve where dB/dt becomes small.

Stated in another way, the present invention provides a new and unusual magnetic pole, or yoke, for a magnetic recording write head wherein the geometric shape of the head's yoke operates to limit the head's write magnetic field or flux to an optimum high value, represent at point 13, and wherein the head's Bg-versus-Iw curve 10 has a very flat saturation region 14. As a result, a write head in accordance with this invention can be driven with an excess magnitude Iw, i.e., magnitudes equal to or greater than magnitude 12, so that the head's write gap flux field Bg increases rapidly to its optimum value, represented at 13. The buildup in the head's write gap flux field abruptly stops at this optimum value, due to saturation 14 of a yoke that has a new and unusual geometry in accordance with this invention.

The flat or generally zero-slope of portion 14 of the FIG. 1's curve 10 provides about a 5 dB improvement in NLTS, as compared to a write head that does not provide a saturation knee in its Bg-versus-Iw curve under typical conditions (see FIG. 1's curve 101).

The portion 16 of curve 10 is associated with the rise time of Iw and should be as short as possible. While the lack of roundness in the saturation knee 11 of curve 10 is important, also of great importance is the presence of the flat slope portion 14 after knee 11.

It is important to note that in two confluence, four confluence, or more generally multiple confluence, yokes in accordance with this invention, it is desirable that the entire X-direction length of at least one of the yoke portions saturate at generally the same time.

Figure 4:
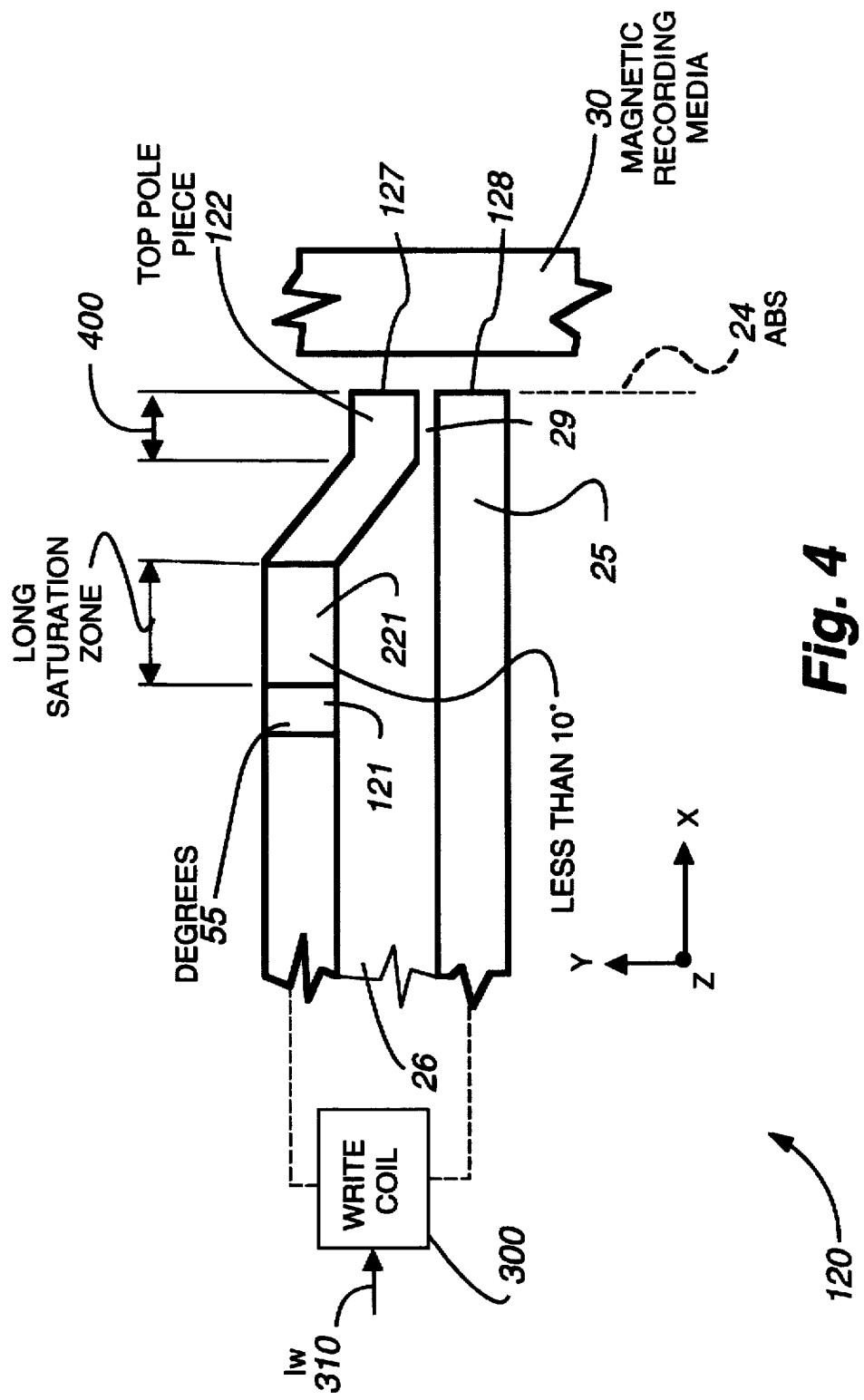
FIG. 4 is a side view of a first embodiment of a magnetic recording write head in accordance with the present invention, this head having a two-step convergence within its top pole piece, this construction and arrangement resulting in a long magnetic saturation zone within the top pole piece, and this construction and arrangement providing the highly desirable Bg-versus-Iw characteristic curve that is shown by the solid line curve of FIG. 1.
Figure 5:
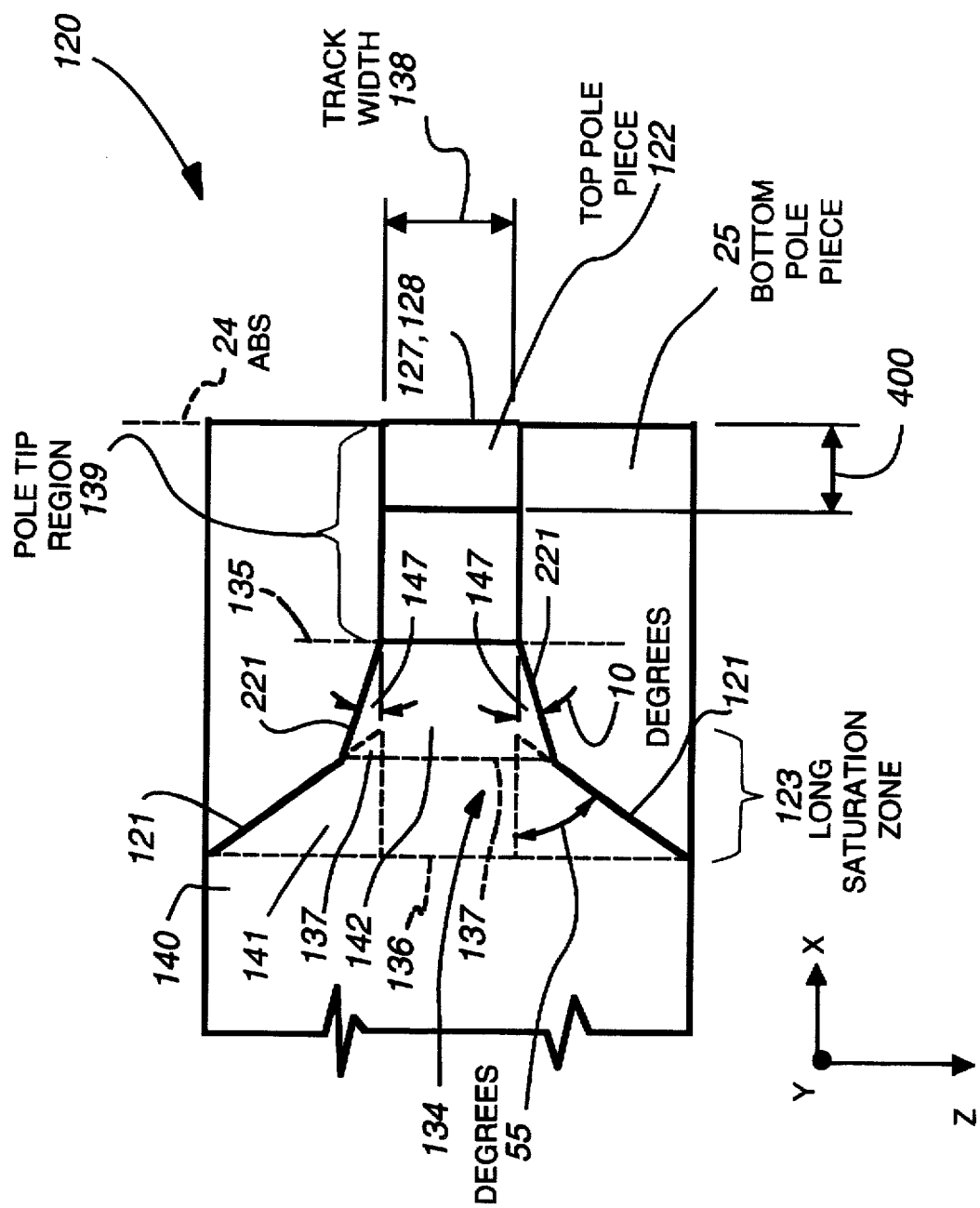
FIG. 5 is a top view of the new and unusual magnetic recording head of FIG. 4.

FIG. 4 is a side view and FIG. 5 is a top view of one embodiment of a magnetic recording write head 120 in accordance with the present invention, this embodiment having multiple convergence portions 141, 142 within the head's top pole piece 122. It should be noted that write head 120 may comprise the write portion of a combined read/write head, whereupon bottom pole piece 25 of FIG. 4 is shared by write gap 29 and by a read gap and read pole piece (not shown).

With reference to FIG. 5, top pole piece 139, when considering in an X-direction that extends toward the head's transducing gap 29, comprises the serial arrangement of a wide portion 140, a first convergent portion 141 that is bounded by dotted lines 136 and 134, a second convergent portion 142 that is bounded by dotted lines 134 and 135, and a narrow pole tip portion 139 that terminates at the write gap 29 shown in FIG. 4.

FIG. 5 shows that top pole piece 139 includes a wide portion 140 that is located remote from write gap 29. Wide portion 140 may be of any of a number of geometric shapes that are not critical to this invention, and in FIG. 5, wide portion 140 remains essentially constant throughout its X-direction length; i.e., the area of portion 140 as measured in the Y-Z plane is essentially a constant.

In accordance with this invention, the Y-Z plane cross-sectional area of first convergent portion 141 continually reduces in magnitude, reaching its smallest cross-sectional area at about dotted line 134. This smallest cross-sectional area at 134 is generally equal to the beginning cross-sectional area 134 of the second convergent portion 142. Note that the side surfaces 121 of this first convergent portion 141 extend at the relatively large angle of about 55-degrees to the figure's X-direction. Due to this fact, the rate of change of the cross-sectional area of this first convergent portion 142 can be defined as a relatively high rate of change. Side surfaces 121 are generally planar surfaces that extend generally normal to the X-Z plane of FIG. 5.

Also in accordance with this invention, the Y-Z plane cross-sectional area of second convergent portion 142 continually reduces in magnitude, reaching its smallest cross-sectional area at about dotted line 135. This smallest cross-sectional area at 135 is generally equal to the constant cross-sectional area of the yoke's tip region 139. Note that the side surfaces 221 of this second convergent portion 142 extend at the relatively small angle of about 5-degrees to the figure's X-direction. Due to this fact, the rate of change of the cross-sectional area of this second convergent portion 142 is a relatively low rate of change as compared to the corresponding rate of change of the first convergent portion 141. Again, side surfaces 221 are generally planar surfaces that extend generally normal to the X-Z plane of FIG. 5.

The head's top pole piece 122 terminates at a narrow tip portion 139 which has a Y-Z plane cross-sectional area that remains essentially constant throughout the X-direction length of portion 139.

Again, considering the magnetic flux density within the above-defined serial arrangement 140, 141, 142, 139 of the head's top pole piece 122, the magnetic flux density is at its lowest value within wide portion 140, and wide portion 140 is not saturated by write currents such as 12 and 15 of FIG. 1. Within the first convergent portion 141 of pole piece 122, the flux density increases in the direction from dotted line 136 to dotted line 134. However, this increase in flux density does not produce appreciable saturation of this portion of pole piece 122. As magnetic flux now enters the second convergent portion 142 of pole piece 122, the flux density begins increasing, and saturation of this portion 142 of pole piece 122 simultaneously occurs throughout its X-direction length. That is, as flux density continues to increase throughout the X-direction length of portion 142, pole piece 122 saturates, the saturated region of pole piece 122 being indicated in FIG. 5 as long saturation zone 123.

The convergence angle 147 of region 142 is less than 12-degrees, and in this case it is 5-degrees. This angle 147 is set such that leakage of flux through space to FIG. 2's bottom pole 25 is exactly compensated, and the entire region 142 saturates at the same value 12 of the write current Iw that is shown in FIG. 1.

Now that pole piece 122 is saturated, the flux flowing through tip region 139 is primarily determined by the flux confining characteristics of the second convergent portion 142 of pole piece 122.

As can be best seen from FIG. 5, the head's first convergence portion 141 is formed by two opposite-side-disposed pole surfaces 121 that taper or converge at a first fast rate, to thereby provide a first fast or high rate of reduction in the cross-sectional area of first convergent portion 141 of top pole piece 122, and the head's second convergence portion 142 is formed by two opposite-side-disposed pole surfaces 221 that taper, or converge, at a second slower rate, to thereby provide a second slower rate of reducing cross-sectional area within the second convergent portion 142 of top pole piece 122.

While the exact shape and angle of surfaces 121, 221 are not to be taken as a limitation on the spirit and scope of this invention, as shown in FIG.5, surfaces 121, 221 are flat and planar surfaces, surfaces extend 121 at generally an angle 137 of about 55-degrees to the figure's X-direction, and surfaces 221 extend at a smaller angle 147 of about 5-degrees to the figure's X-direction.

As a result of this two-step reduction in pole cross-sectional area between dotted lines 136, 134 and 134, 135 of FIG. 5, magnetic flux saturation of top pole piece 122 occurs within a relatively long X-direction flux saturation zone 123 that extends generally between dotted lines 134, 135. As defined herein, the length dimension of long saturation zone 123 is measured in the X-direction that extends generally normal to the head's air bearing surface (ABS) 24.

Head 120 may take a variety of specific forms. For purposes of simplicity, head 120 is shown in FIGS. 4 and 5 as having only a bottom yoke 25, an intermediate nonmagnetic or gap layer 26 (see FIG. 4), and a top yoke 122. Electrical energization 310 of write coil 300 operates to induce magnetic flux to flow through the series flux circuit that comprises pole piece 25, gap 29, and pole piece 122.

The two parallel and physically spaced tips 127, 128 of the respective top and bottom poles 122, 25 are planar-coincident; i.e., they both lie in the same Y-Z plane. Tips 127, 128 form a write transducing gap, or space 29, that is occupied or filled by gap material 26. The specific materials from which poles 22, 25 and gap 29 are formed are not critical to this invention. It suffices to say that poles 22, 25 are made from a material that has a high permeability, a low coercivity, and a high electrical resistance, an example of which is the Permalloy brand of NiFe. Gap 29 comprises a nonmagnetic material, an example of which is alumina.

Figure 2:
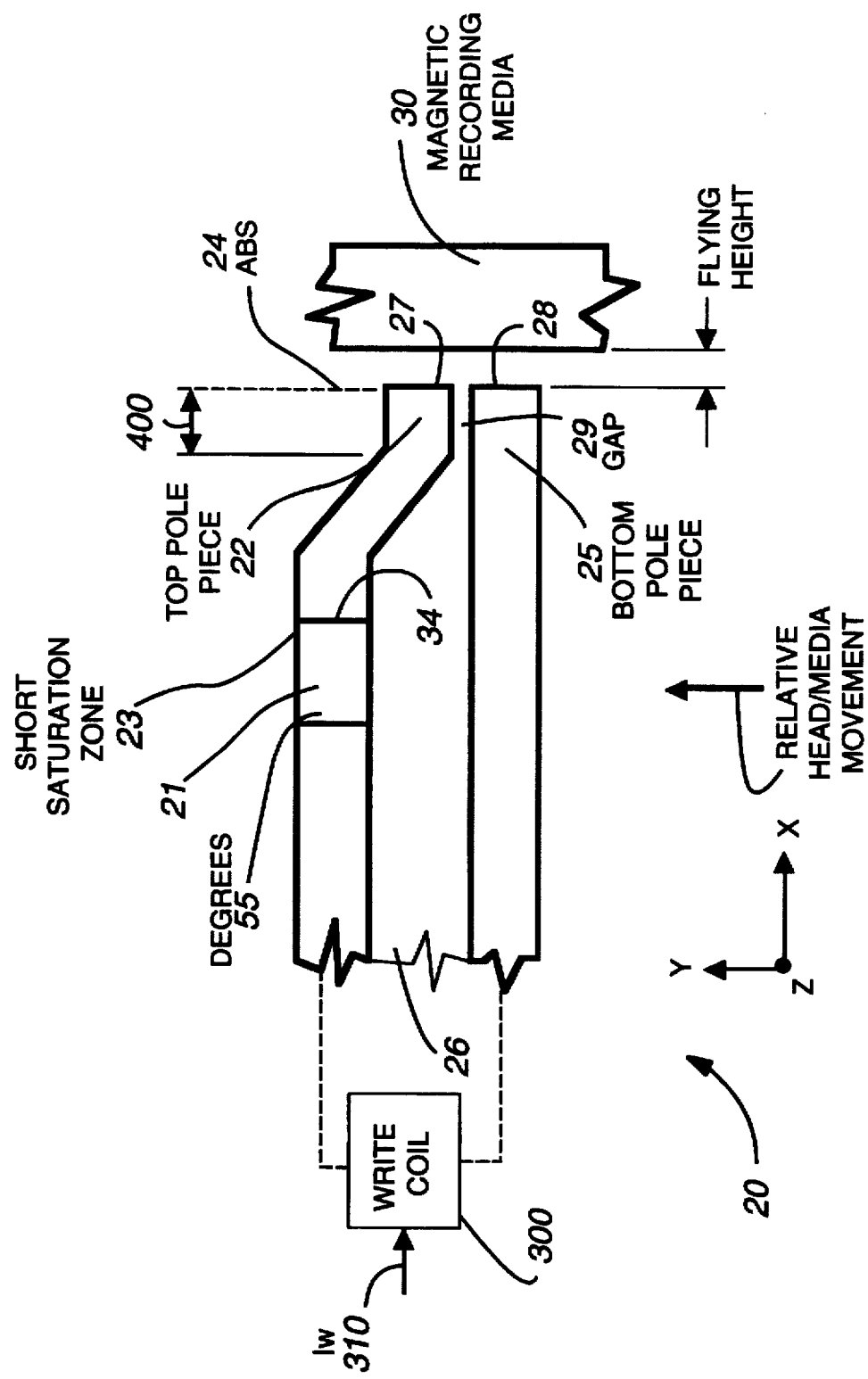
FIG. 2 is a side view of a prior art magnetic recording write head having a single convergence region within its top pole piece, this construction and arrangement resulting in a short magnetic saturation zone within the top pole piece.
Figure 3:
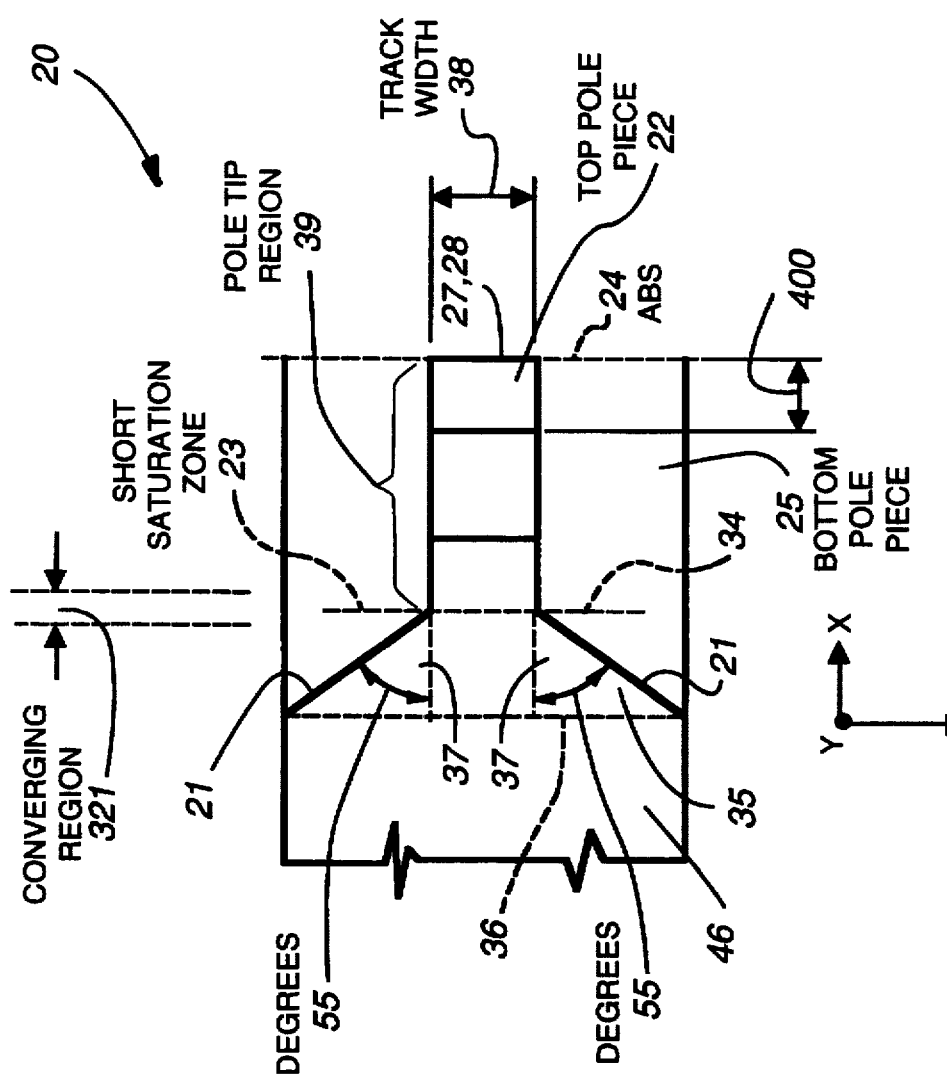
FIG. 3 is a top view of the prior art magnetic recording head of FIG. 2.

As was explained relative to FIGS. 3 and 4, a fringe magnetic field at the generally three dimensional X-Y-Z volume of gap 29 operates to induce a remnant state of magnetization in the Y-direction, and throughout an X-direction depth, of a closely adjacent magnetic recording media such as 30 of FIG. 2, as relative Y-direction movement occurs between head 120 and the media.

As stated previously, magnetic recording media 30 may comprise a length of magnetic recording tape, or may comprise an annular portion of a magnetic recording disk that is spinning on an X-direction axis, this annular disk portion extending between the disk's inner diameter track (ID) and the disk's outer diameter track (OD). As shown in FIG. 5, the head's write-track-width 138 is generally determined by the Z-direction width of tip 127 of upper pole piece 122.

Write head 120 may comprise an in-contact head or a flying head, as above described.

As a result of this embodiment of the present invention, write head yokes or pole pieces, such as top yoke 122 of FIGS. 4, 5, are formed to have a multiple funnel shape 141, 142, as is defined by the two oppositely disposed confluence surface pairs 121, 221 shown in FIG. 5, such that two break points 134, 135 are provided prior to the decreasing cross-sectional area of yoke 122 joining the yoke's constant area tip region 139. This construction and arrangement operates to provide a Bg-vs-Iw operating characteristic having a high magnitude and deep Bg, as well as a very flat saturation region. These new and unusual effects are achieved by having two or more width-slope-break-points 134, 135, also called confluence-points, in the head's yoke geometry, as above described.

FIG. 6 is a view similar to FIG. 5 in that FIG. 6 again shows the top view of top pole piece 122 having the two magnetic flux convergence zones 141, 142.

In the following discussion of various embodiments of the invention, (1) the head's write track width is identified as dimension Z1, (2) the head's throat height is identified at 400, (3) distance X1 is measured from the side 401 of head throat 400 to the end 402 of the second flux convergent zone 142, (4) distance X2 is measured from the end 402 of the second flux convergent zone 142 to the end 403 of the second flux convergent zone 142, and (5) distance Z2 is the Z-direction width of the end 403 of the second flux convergent zone 142. Note that a head's throat height 400 is also seen in FIGS. 2, 3, 4, 5 and 7.

In embodiments of the invention, the head's write track width Z1 was maintained generally at about 3.0 microns, X1 varied from about 2.5 to about 3.5 microns, X2 varied from about 2.5 to about 4.0 microns, Z2 was maintained at a value generally equal to 3+2(X2)(tangent of 5-degrees), and the Y-direction thickness of top pole piece 122 was about 4.0 microns.

Figure 6:
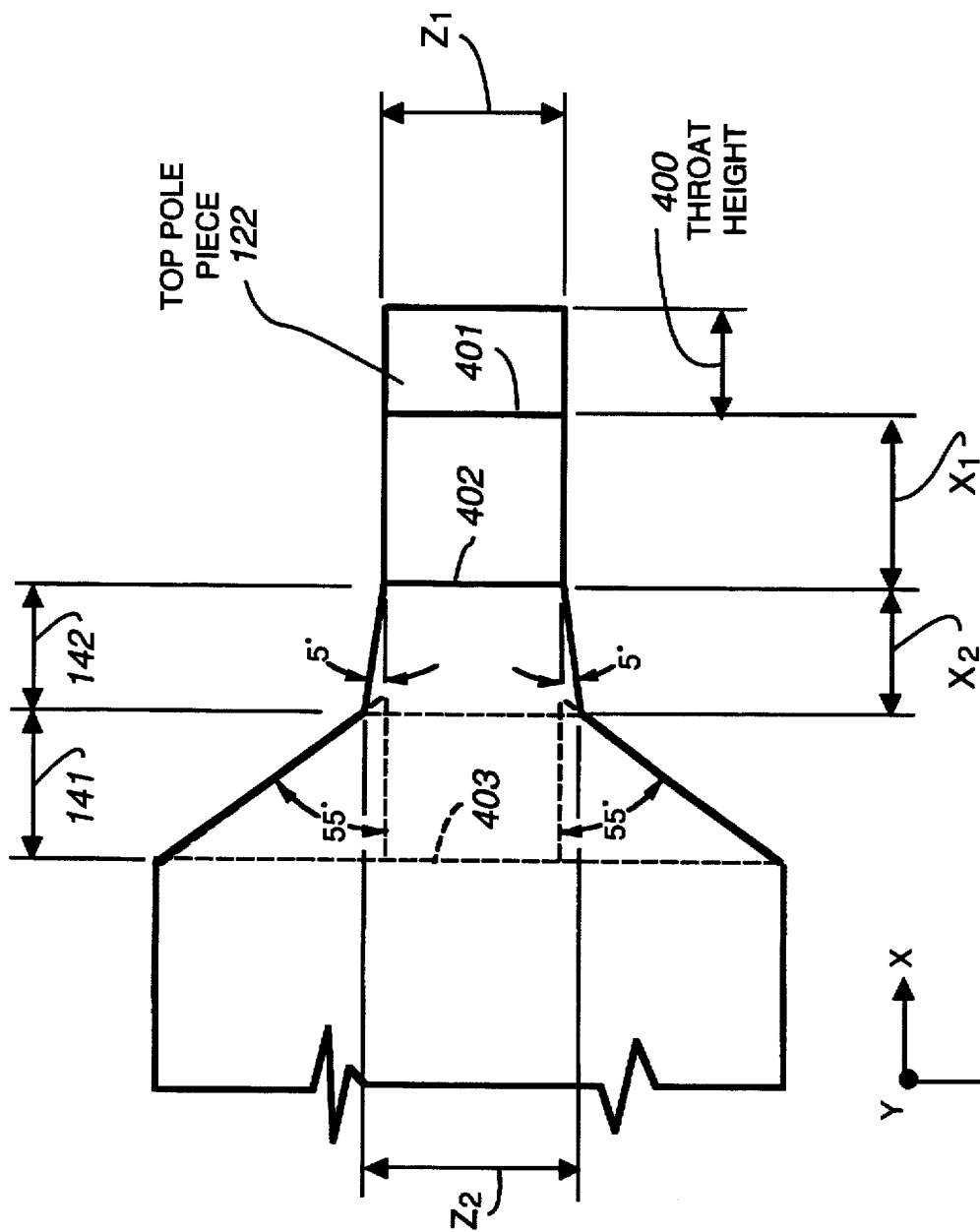

As is well known, and with reference to FIG. 2, the point 401 of FIG. 6 at which the head's top pole 22 to bottom pole 25 separation begins to increase beyond the dimension of the head's gap 29 is called the head's zero throat point.

Figure 7:
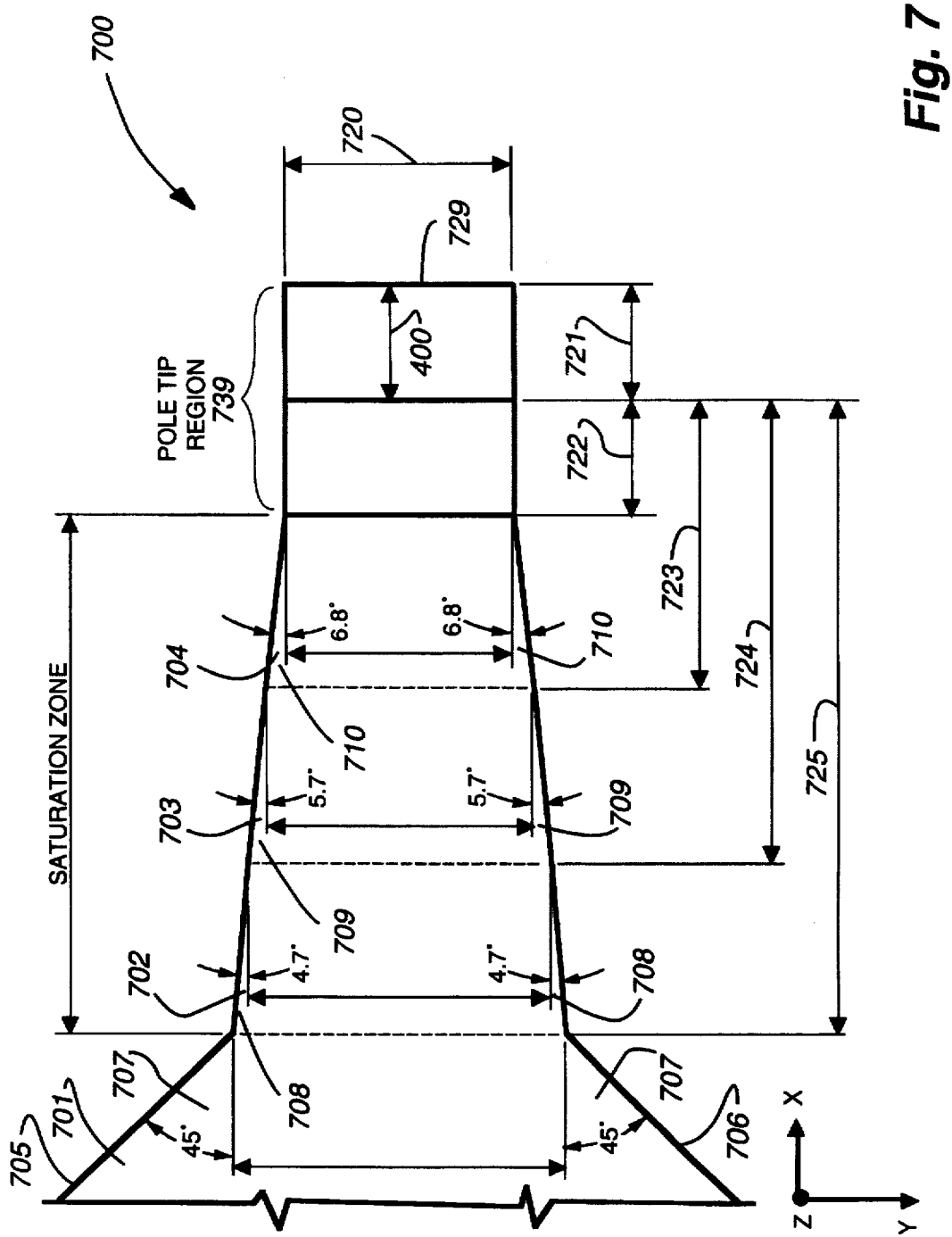
FIG. 7 is a top view of a second embodiment of a magnetic recording write head in accordance with the present invention, this head having a four-step convergence within its top pole piece, this construction and arrangement also resulting in a long magnetic saturation zone within the top pole piece, and this construction and arrangement also providing the highly desirable Bg-versus-Iw characteristic curve that is shown by the solid line curve of FIG. 1.

FIG. 7 is a top view of a second embodiment of a magnetic recording write head in accordance with the present invention, this head having a four-step convergence 701–704 within its top pole piece 700. This construction and arrangement also results in a long X-direction magnetic saturation zone within top pole piece 700, and this construction and arrangement also providing the highly desirable Bg-versus-Iw characteristic curve 16, 14 that is shown in the solid line curve of FIG. 1.

In this embodiment of the invention, the first and widest convergent region 701 is defined by the two side surfaces 705 and 706 that extend at an angle 707 of about 45-degrees to the figure's X direction.

The second through the fourth convergent regions 702–704 are respectively defined by similar side surfaces that extent at progressively larger angles to the figure's X direction. More specifically, the side walls or surfaces of the second convergent region 702 extend at an angle 708 of about 4.7-degrees to the figure's X direction, the side walls of the third convergent region 703 extend at an angle 709 of about 5.7-degrees to the figure's X direction, and the side walls of the fourth convergent region 704 extend at an angle 710 of about 6.8-degrees to the figure's X direction When one compares the FIG. 7 embodiment of this invention to the FIG. 4–6 embodiment of this invention, it is seen that FIG. 7's widest converging region 705 corresponds to FIG. 4–6's widest converging region 141, and that the composite converging region 702–704 of FIG. 7 corresponds to FIG. 4–6's converging region 142. That is, the rate of change of the cross-sectional area of FIG. 7's region 705 is high relative to the rate of change of the cross-sectional area of FIG. 7's composite region 702–704.

Note, however, that within FIG. 7's composite region 702–704 the rate of change of the cross-sectional area step-increases in the direction of write gap surface 729. That is, (1) the rate of change of the cross-sectional area of region 702, as is determined by angle 708 of about 4.7-degrees, is less that that of region 703, (2) the rate of change of cross-sectional area of region 703, as is determined by angle 709 of about 5.7-degrees, is less than that of region 704, and (3) the rate of change of cross-sectional area of region 704 is the highest that is found within the composite region 702–704, this rate of change being determined by angle 710 of about 6.8-degrees.

Examples of dimensions of the FIG. 7 embodiment of the invention included a zero throat dimension 721 of about 1.5 microns, a dimension 722 of about 0.94 microns, a dimension 723 of about 2.2 microns, a dimension 724 of about 4.7 microns, and a dimension 725 of about 7.2 microns.

From the above detailed description of embodiments of this invention it can be seen that a magnetic write head is provided wherein NLTS, OVW, and read-back pulse width are improved by virtue of a pole/yoke/flux-pipe design that yields a large magnitude deep gap field Bg 13 within the head's write-gap, while at the same time providing a very flat saturation region 14 within the head's FIG. 1 Bg-vs-Iw characteristic curve 10.

These new and unusual results are achieved by providing a head yoke that has at least two cross-sectional-area-change break points. That is, the two stage funnel shape of FIG. 5, 6 and the four stage funnel shape of FIG. 7 are tailored to converge, contract, or reduce in multiple stages, such that a long X-direction region of the pole piece saturates at generally the same time, and when the optimum desired value 13 of Bg has been reached in the head's gap as a result of energizing the head's write coil with a Iw that is equal to, or exceeds, FIG. 1's magnitude 12. The long length of this saturation zone inhibits the Bg within the write gap from exceeding the desired value 13 of Bg. As a result, an excess magnitude 15 of Iw can be used to energize the head's write coil, thus providing a very high time rate of change of Bg (dB/dt) during the head's write process. This in turn yields good NLTS and OVW.

In addition, during read-back of a magnetic media bit, transition, or pulse that has been written by a head that is constructed and arranged in accordance with this invention, it has been found that the 50-percent pulse width (PW50) of the read-back pulse has been decreased; i.e., minimized, by operation of this invention.

As was mentioned, a low slope is required of the saturation portion 14 of FIG. 1's Bg-vs-Iw curve 10. This highly desirable low or nearly zero slope for saturation portion 14 of curve 10 is obtained by providing (see FIGS. 5 and 7) a long, multiple-step, X-direction distance between the point where the wide portion of the yoke begins to narrow, and the point where the now-fully-narrowed yoke matches the constant narrow width of pole tip region.

In accordance with this invention, the rate of change of cross-sectional area within a first yoke region that is distant from the write gap is of a first relatively high value (see region 141 of FIG. 5 and region 701 of FIG. 7), and the rate of change of cross-sectional area within a second yoke region that is closer to the write gap is of a second relatively lower value (see region 142 of FIG. 5 and composite region 702–704 of FIG. 7). Preferably, but without limitation thereto, the rate of change of cross-sectional area within a third yoke region that terminates at the write gap is zero (see region 139 of FIG. 5 and region 739 of FIG. 7).

Magnetic flux is induced to flow within the yoke by operation of a write coil. This flux is confined to its smallest area within the above-mentioned third yoke portion. The magnitude of the write-flux Bg that flows at the write gap is controlled to be equal to the value 13, shown in FIG. 1, by virtue of the above-described first and second yoke convergence zones that yield a X-direction long saturation zone within at least the second region of the yoke.

In accordance with this invention, the yoke's entire X-direction saturation zone saturates simultaneously when the optimum value 13 of the write-flux Bg is reached. The X-direction length of the yoke's saturation zone prevents the Bg from thereafter increasing by any great amount, thereby yielding the low saturation slope curve portion 14 shown in FIG. 1. Stated in another way, the cross-sectional area of a funnel shaped magnetic flux pipe is tailored as a function of its X-direction length such that flux density Bg is constant just prior to saturation of the flux pipe. As a result, the entire length of the yoke's multiple funnel tailored zone saturates at generally the same moment, and a sharp knee 14 is produced in FIG. 1's curve 10.

The above-detailed description of preferred embodiments of this invention is not to be taken as a limitation on the spirit and scope of this invention, since it is known that those skilled in this art will, upon learning of this invention, visualize yet other embodiments that are likewise within the spirit and scope of this invention.

What is claimed is:

1. In a magnetic recording head having:
   a bottom yoke member having a first relatively wide and planar tip area;
   a top yoke member having a second relatively narrow and planar tip area;
   said first and second planar tip areas being coplanar and defining a generally planar recording gap;
   said generally planar recording gap being adapted to move relative to generally planar magnetic recording media;
   coil means associated with said bottom and top yoke members; and
   current energizing means for energizing said coil means with current of a magnitude Iw;
   said current energization of said coil means causing magnetic flux to flow, and to produce a given magnetic flux gap field Bg at said magnetic recording gap, said top yoke member comprising;
   a first yoke portion having a generally large cross-sectional area;
   said first yoke portion being directly associated with said coil means;
   a second yoke portion having a first generally large cross-sectional area connected to said first yoke portion, and having a first generally smaller cross-sectional area that is spaced from said first generally large cross-sectional area;
   said second yoke portion having a cross-sectional area that reduces at a first rate when considered from said first generally large cross-sectional area to said first generally smaller cross-sectional area;
   a third yoke portion having a second generally large cross-sectional area connected to said first generally smaller cross-sectional area; and having a second generally smaller cross-sectional area that is spaced from said second generally large cross-sectional area;
   said third yoke portion having a cross-sectional area that reduces at a second rate that is less than said first rate when considered from said second generally large cross-sectional area to said second generally smaller cross-sectional area; and
   a throat yoke portion having a generally constant cross-sectional area;
   said throat yoke portion having one end connected to said second generally smaller cross-sectional area, and having an opposite end defining said second relatively narrow and planar tip area;
   said first and second rates of cross-sectional area reduction being selected to cause said third yoke portion to uniformly saturate along its length as a result of said energization of said coil means, to thereby provide said given magnetic flux gap field Bg at said magnetic recording gap.

2. The magnetic recording head of claim 1 wherein said coil means is energized with current of a magnitude that is greater than Iw, said saturation of said third yoke portion operating to ensure that said magnetic field at said recording gap remains substantially constant at said given magnetic Bg.

3. The magnetic recording head of claim 2 wherein said recording gap comprises a write gap and wherein said bottom yoke member is shared with a read gap.

4. The magnetic recording head of claim 2 wherein:
   said first, second, third and throat yoke portions are of generally the same thickness in a direction measured generally normal to a direction of said flux flow;
   said second yoke portion comprises a first trapezoid having a first relatively long parallel side that forms said first generally large cross-sectional area, having a second relatively short parallel side that forms said first generally smaller cross-sectional area, and having first and second tapered sides that extend at an angle in the range of about 45-degrees to about 55-degrees to said direction of flux flow; and
   said third yoke portion comprises a second trapezoid having a first relatively long parallel side that forms said second generally large cross-sectional area, having a second relatively short parallel side that forms said second generally smaller cross-sectional area, and having first and second tapered sides that extend at an angle that is less than about 12-degrees to said direction of flux flow.

5. The magnetic recording head of claim 4 wherein said recording gap comprises a write gap and wherein said bottom yoke member is shared with a read gap.

6. The magnetic recording head of claim 2 wherein:
   said first, second, third and throat yoke portions are of generally the same thickness in a direction measured generally normal to a direction of said flux flow;
   said second yoke portion comprises a first trapezoid having a long parallel side that forms said first generally large cross-sectional area, having a short parallel side that forms said first generally smaller cross-sectional area, and having first and second tapered sides that extend at an angle in the range of about 45-degrees to said direction of flux flow; and
   said third yoke portion comprises a serial arrangement of a second, a third and a fourth trapezoid;
   said second trapezoid having a long parallel side that forms said second generally large cross-sectional area;
   said fourth trapezoid having a short parallel side that forms said second generally smaller cross-sectional area;
   said second, third and fourth trapezoids individually having tapered sides that respectively extend at angles of about 5-degrees; about 6-degrees; and about 7-degrees; to said direction of flux flow.

7. A magnetic recording head including:
   a yoke member with a tip area that defines a write gap adapted to move relative to magnetic recording media;
   coil means associated with said yoke member;
   current energizing means for energizing said coil means with current of a magnitude Iw;
   said current energization of said coil means operating to cause magnetic flux to flow, and to produce a given magnetic flux gap field Bg at said write gap, said yoke member having;
   a first yoke portion having a generally large cross-sectional area when considered in a direction of said flux flow;
   a second yoke portion formed in the shape of a first funnel;
   said first funnel having a first large entry area that connects to said first yoke portion;

said first funnel having a first smaller exit area that is spaced from said first large entry area;

a second yoke portion formed in the shape of a second funnel;

said second funnel having a second large entry area that connects and generally conforms in size to said first smaller exit area of said first funnel;

said second funnel having a second smaller exit area that is spaced from said second large entry area of said second funnel; and said second smaller exit area of said second funnel being connected to said tip area.

8. The magnetic recording head of claim 7 wherein said magnitude Iw of current is selected to cause magnetic saturation of at least a portion of said second funnel extending between said second large entry area and said second smaller exit area of said second funnel.

9. The magnetic recording head of claim 8 wherein said yoke member includes:

a throat portion having a relatively small cross-sectional area when considered in a direction of said flux flow;

said throat portion being connected intermediate said tip portion and said second smaller exit area of said second funnel; and said throat portion having a cross-sectional area generally equal to said second smaller exit area of said second funnel.

10. The magnetic recording head of claim 9 wherein said first funnel defines an included angle of about 110-degrees, and wherein said second funnel defines an included angle that is less than about 24-degrees.

11. The magnetic recording head of claim 10 wherein:

said first funnel and said second funnel are of generally equal lengths as measured in said direction of said flux flow.

12. The magnetic recording head of claim 8 wherein:

said first funnel defines an included angle of about 90-degrees; and said second funnel comprises a serial arrangement of a first, a second and a third trapezoid;

said first trapezoid defining an included angle of about 10-degrees;

said second trapezoid defining an included angle of about 12-degrees; and said third trapezoid defining an included angle of about 14-degrees.

* * * * *